US005498950A

United States Patent [19]
Ouwerkerk

[11] Patent Number: 5,498,950
[45] Date of Patent: Mar. 12, 1996

[54] BATTERY MONITORING, CHARGING AND BALANCING APPARATUS

[75] Inventor: David B. Ouwerkerk, Torrance, Calif.

[73] Assignee: Delco Electronics Corp.

[21] Appl. No.: 237,565

[22] Filed: Apr. 29, 1994

[51] Int. Cl.[6] .................................................. H01M 10/46
[52] U.S. Cl. ................................. 320/18; 320/35; 320/39
[58] Field of Search ................................. 320/15, 17, 18, 320/29, 30, 35, 36, 39, 40

[56] References Cited

U.S. PATENT DOCUMENTS

| | | | |
|---|---|---|---|
| 4,238,721 | 12/1980 | DeLuca et al. | 320/18 |
| 4,467,266 | 8/1984 | Ritchie | 320/18 X |
| 4,616,170 | 10/1986 | Urstöger | 320/18 X |
| 5,153,496 | 10/1992 | LaForge | 320/17 |
| 5,283,512 | 2/1994 | Stadnick et al. | 320/18 |

Primary Examiner—Peter S. Wong
Assistant Examiner—Edward Tso
Attorney, Agent, or Firm—Mark A. Navarre; Leonard A. Alkov

[57] ABSTRACT

Battery charging apparatus comprising a power source coupled to a battery pack comprising a series connected plurality of batteries, and a charge controller and battery balancer coupled to the battery pack that monitors, controls the charging of, and balances the plurality of batteries of the battery pack. The power source is used to charge all of the batteries under control of a controller. The controller is coupled to an isolated current source in the battery balancer and to a battery voltage sensor. The controller is coupled to a plurality of sensors that monitor predetermined battery conditions. The isolated current source and battery voltage sensor are coupled to each battery of the battery pack by way of a monitoring bus and a plurality of controlled switches. The controller monitors the individual battery voltages using the battery voltage sensor and controls the isolated current source to individually balance low-voltage batteries based upon voltages sensed by the battery voltage sensor.

6 Claims, 2 Drawing Sheets

BATTERY MONITORING, CHARGING AND BALANCING APPARATUS

BACKGROUND

The present invention relates to battery chargers, and more particularly, to battery charging apparatus that provides for battery monitoring, charge control, and battery balancing for use with an electric vehicle, and the like.

The assignee of the present invention designs, develops and manufactures battery charging systems for use in charging batteries of electric vehicles, and the like. Battery packs used in electric vehicles are typically strings of batteries, having on the order of 150 series coupled cells. The ability to balance the energy contained in each of the batteries improves their life and useful capacity.

There is a tendency for each cell within individual batteries, when connected in series, to have a different energy storage capacity. This is caused be many variables including, but not limited to, temperature, initial tolerances, material impurities, porosity, electrolyte density, surface contamination, and age. When discharging a series string of batteries (a battery pack), the amount of useful energy that can be extracted depends upon the weakest cell or battery. Battery balancing is therefore periodically required to maximize energy storage capacity of the battery pack. Reduced energy storage capacity equates to reduced battery pack life. This is due to the damage caused by "cell reversal" encountered when one cell is much different from the others in terms of its stored energy.

The classical means for balancing a battery pack is called equalization charging. This involves passing a low current through the battery pack thus charging the low cells while the fully charged cells slowly evolve gas (through electrolysis). It is done at a low current to minimize damage to "good" cells.

Balancing batteries during discharge (propulsion of an electric vehicle, for example) is especially important for situations where only quick recharging is used. Balancing is a low magnitude but long duration process, and conventional equalization charging is also a slow process. Quick recharging is unable to fully charge a battery pack due to limitations of most battery chemistries (chemical transport limit). This tends to aggravate balancing because there is no time for periodic equalization charging.

Therefore, it is an objective of the present invention to provide for battery charging apparatus that provides for battery monitoring, charge control, and battery balancing for use with an electric vehicle, and the like.

SUMMARY OF THE INVENTION

In order to meet the above and other objectives, the present invention provides for battery charging apparatus comprising a power source, and a charge controller and battery balancer that monitors, controls the charging of, and balances a plurality of series connected batteries comprising a battery pack. The power source is coupled to the battery pack and is used to charge all of the batteries under control of a controller. The controller is coupled to a battery balancer and to a voltage sensor. The battery balancer and voltage sensor are coupled to each battery of the battery pack by way of a monitoring bus and a plurality of controlled switches. The controller controls the battery balancer to individually balance weak batteries based upon voltages sensed by the voltage sensor.

More particularly, the present invention provides for apparatus for monitoring, charging and balancing the plurality of serially connected batteries. The apparatus comprises a power source coupled across the plurality of serially connected batteries for providing charging power thereto, a plurality of sensors coupled to the plurality of batteries for monitoring predetermined conditions thereof, and a controller coupled to the power source and to the batteries for controlling charging of the batteries.

The controller is coupled to the power source and communicates with and controls its operation to charge the plurality of serially connected batteries. The controller is coupled to the plurality of sensors for monitoring the predetermined conditions. A plurality of controlled switches are provided wherein adjacent pairs are coupled to respective positive and negative terminals of a battery. A monitoring bus is coupled to the plurality of controlled switches. A battery voltage sensor is coupled to each of the plurality of controlled switches by way of the monitoring bus and to the controller, for selectively sensing the voltage of each of the plurality of batteries under control of the controller. A current source is coupled to the plurality of controlled switches by way of the monitoring bus, and to the controller, for supplying current to a selected battery of the plurality of batteries under control of the controller.

The present invention monitors the batteries of the battery pack to prevent too deep of a discharge and signals an operator of an electric vehicle that "cell reversal" (cell damage) is imminent. The present invention also control charging of the batteries up to the point where overcharging of a cell or battery occurs. The present invention then uses sense lines to balance an individual cell, battery, or combination of batteries of the battery pack. This minimizes the overall degradation of the battery pack by localizing of equalizing battery charge. Balancing the batteries of the battery pack improves battery life and useful capacity. The present invention provides significant advantages for recharging electric vehicle battery packs. The present invention is also much more efficient than conventional battery charging apparatus. The present invention monitors the battery pack during discharge (propulsion), controls battery recharging, and balances individual cells, batteries, or combinations of batteries.

Balancing the batteries during discharge (propulsion of the electric vehicle) is especially important for situations where only quick recharging is used to charge the battery pack. Quick recharging is normally unable to fully charge a battery pack due to limitations of most battery chemistries (chemical transport limit). This tends to aggravate balancing as there is no time for periodic and long duration equalization charging. The present "on the run" battery balancing offers a simple and convenient means for balancing the batteries. Balancing is a low magnitude but long duration process. Conventional equalization is also a slow process so the balancing apparatus of the present invention is at least comparable if not faster.

The present invention was developed for use on electric vehicles to address battery pack energy storage capacity issues and battery pack life. Without some means of battery pack equalization or balancing, electric vehicle battery packs have extremely poor capacity and life, especially if cell data is extrapolated to characterize the battery pack. The present invention has applications other than use in electric vehicles. The present invention may be used in any application employing large series strings of batteries or cells, including but not limited to uninterruptable power supplies, spacecraft, and fixed site battery energy storage, and the like.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
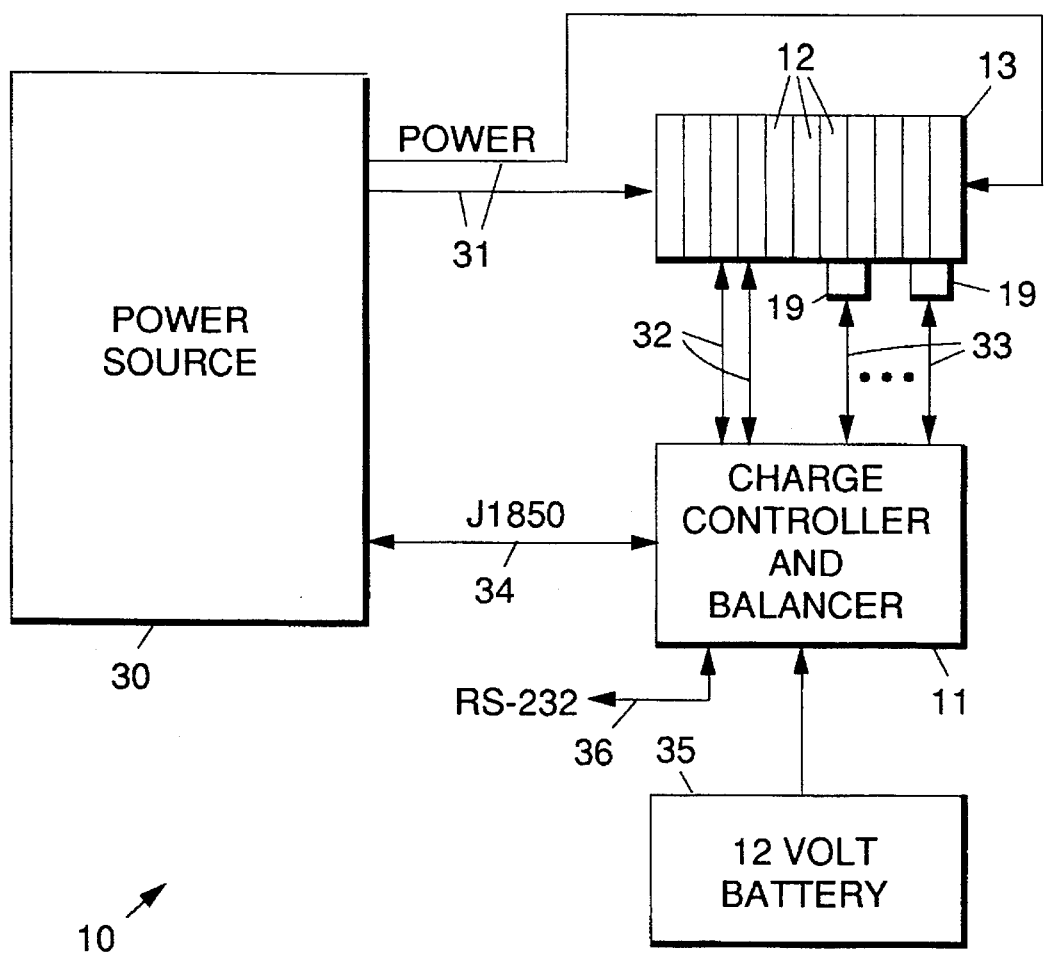
FIG. 1 illustrates a block diagram of battery charging apparatus in accordance with the principles of the present invention.

Referring to the drawing figures, FIG. 1 illustrates a block diagram of charging apparatus 10 in accordance with the principles of the present invention for monitoring, charging and balancing the plurality of serially connected batteries 12 of a battery pack 13 of an electric vehicle (not shown), for example. The charging apparatus 10 comprises a power source 30 that is coupled to the battery pack 13 by way of power charging lines 31. It is to be understood that the power source 30 may be coupled through an independent controller (not shown) to the battery pack 13. A charge controller and battery balancer 11 is coupled to the plurality of serially connected batteries 12 by way of battery sense lines 32, and to a plurality of sensors 19 coupled to the battery pack 13 by way of a plurality of sensor input lines 33. A battery 35 is coupled to the charge controller and battery balancer 11 for providing unregulated power thereto to power it and to provide power to an isolated current source that is used to balance the plurality of series connected batteries 12. An RS-232 bus 36 is coupled to the charge controller and battery balancer 11 to permit programming thereof. The charge controller and battery balancer 11 is used to control charging of the battery pack 13 and control charging and balancing of individual ones of the plurality of series connected batteries 12.

Figure 2:
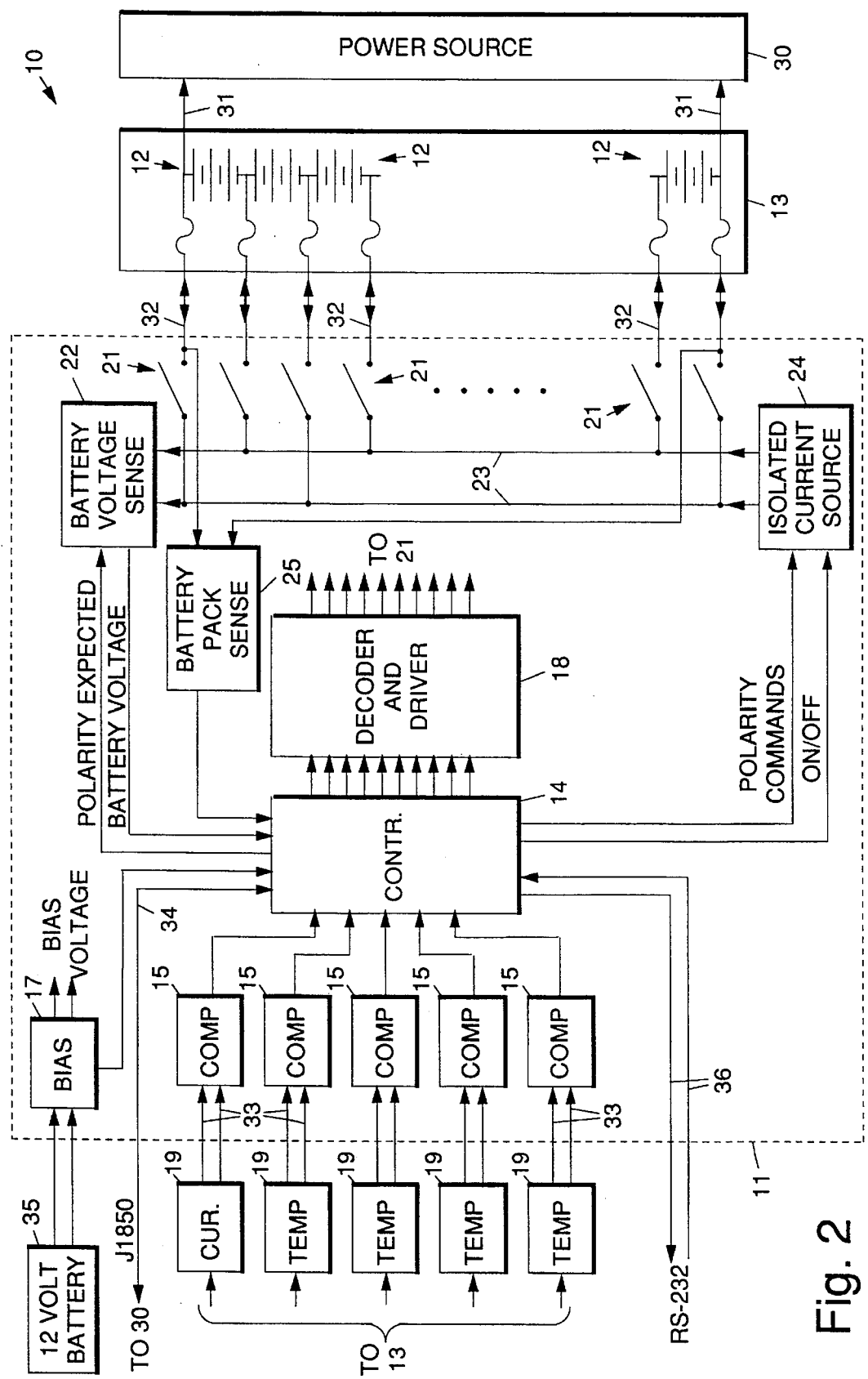
FIG. 2 illustrates a detailed block diagram of battery charging apparatus of FIG. 1.

FIG. 2 illustrates a detailed block diagram of battery charging apparatus 10 of FIG. 1, and in particular, details of the charge controller and battery balancer 11. The charge controller and battery balancer 11 comprises a controller 14, such as a Motorola 68HC11 type microcontroller, for example. It is to be understood that any suitable microcontroller may be adapted for use as the controller 14 in the charge controller and battery balancer 11. The microcontroller is programmable by way of the RS-232 bus. It is to be understood that any suitable programming/monitoring bus 36 may be adapted for use with the present invention.

The controller 14 is coupled by way of a plurality of signal conditioners 15 to the plurality of sensors 19 disposed on the battery pack 13 that monitor various conditions relating to the battery pack 13. The signal conditioners 15 are used to condition sensed signals derived from the sensors 16 to feed into the controller 14. Internal to the controller 14 the sense signals are compared to predetermined programmable threshold values. A bias supply 17 is coupled to the battery 35 that produces a plurality of bias voltages that are used to power the circuits in the charge controller and battery balancer 11. A decoder and driver circuit 18 is coupled between the controller 14 and a plurality of controlled switches 21. Respective ones of the controlled switches 21 are coupled between respective batteries 12 of the battery pack 13. More particularly, an adjacent pair of controlled switches 21 are coupled to respective positive and negative terminals of a battery 12. Control signals are coupled to the controlled switches 21 from the controller 14 by way of the decoder and driver circuit 18.

A battery pack sensing circuit 25 is used to sense the output voltage of the battery pack 13 and provides a signal indicative thereof to the controller 14. A battery voltage sensor 22 is coupled between each of the batteries 12 of the battery pack 13 and the controller 14. The battery voltage sensor 22 is coupled through a monitoring bus 23 and the plurality of controlled switches 21 to the batteries 12. The monitoring bus 23 is also coupled to an isolated current source 24 or battery balancer 24. The an isolated current source 24 or battery balancer 24 is typically a low current source, such as may be provided by a 0.5 amp current source, for example.

The battery voltage sensing circuit 22 senses the output voltage of a particular battery 12 selected by the controller 14 using the decoder and drive circuit 18 to select a particular pair of controlled switches 21 for actuation. The battery voltage sensing circuit 22 provides a voltage signal indicative of the sensed battery voltage to the controller 14. The isolated current source 24 or battery balancer 24 is coupled to the controller 14 and to the plurality of controlled switches 21 by way of the monitoring bus 23. The isolated current source 24 provides a charging current to a selected battery 12 that is connected to the monitoring bus 23 by way of the controlled switches 21 in order to balance the cells or battery thereof with respect to the remaining batteries 12 of the battery pack 13.

The battery voltage sensing circuit 22 is used to sequentially sense the voltage of each respective battery 12 wherein the controller activates a pair of controlled switches 21 to connect a selected battery 12 to the battery voltage sensing circuit 22 by way of the monitoring bus. The controller 14 steps through each pair of controlled switches 21 to sense the voltage of all batteries 12. Once the voltages are sensed, those batteries 12 that are low relative to the other batteries 12 are tagged in the controller 14. The controller 14 sequentially activates the pair of controlled switches 21 that are coupled across the low voltage battery 12, and the battery balancer 24 is activated to charge the battery 12 to a proper voltage level. Each battery 12 having a low voltage is charged using the battery balancer 24 in this manner. Consequently, all batteries 12 of the battery pack 13 are continuously balanced.

The controller 11 monitors the sensors 19 coupled to the battery pack 13 and monitors control signals, temperatures, current into and out of the battery pack 13, voltage of the battery pack 13, voltages of individual batteries 12, or outputs of selected combinations of batteries 12, for example. The controller 11 controls the monitoring of the batteries 12, and this is done in a time sequenced manner, because battery charging tends to be relatively slow changing event. The controller 14 also provides commands to the isolated current source 24, or battery balancer 24, to source current into the monitoring bus 16 as required to balance a particular battery 12. Using the voltage data sensed by the battery voltage sensing circuit 22 by way of the controlled switches 21 and the monitoring bus 16 to determine low voltage batteries 12, a small amount of current is caused to flow into an individual battery 12 from the current source 24 into each low voltage battery 12, thus effecting balancing with respect to all other batteries 12 in the battery pack 13.

The control provided by the charge controller and battery balancer 11 is implemented by way of embedded software (firmware) located in the controller 14. The use of software or firmware is not required to implement the present invention, and hardware may be used to implement the control logic, but the use of software provides for development flexibility. This programming is implemented in a conventional manner and will not be described in detail herein.

The output of the controller 14 comprises a plurality of control signals, which may include serial, parallel or discrete output signals, for example. In an embodiment that was reduced to practice, the J1850 serial communication port is used to control the operation of the power source 30. However, implementation of the output signals (serial/parallel/discrete) is not limited to these particular output signals. The following data is conveyed by way of the outputs of the charge controller and battery balancer 11: state of charge of each of the batteries 12, balancing data that may be used to indicate an unsafe or damaged battery 12 during discharge, and charging control signals to control charging power to the batteries 12.

The battery pack 13 is only as good as it weakest link. This means that the battery pack 13 fails as soon as one battery 12 within the battery pack 13 fails, or its capacity is only as good at the weakest battery 12. Differences in materials, manufacturing processes (dimensions, porosity, electrolyte density, etc.), temperature, age or past history, and even surface contaminations (i.e. dirt) cause each battery 12 within the battery pack 13 to act independently. Battery packs 13 for use in electric vehicles, for example, typically have over 20 batteries 12. All of the batteries 12 do not operate the same. Since the batteries 12 are in series, the small iniquities tend to be aggravated with time and usage unless corrective action is taken.

Based upon experience, batteries 12 tend to become unbalanced with time depending on their use, care, and charging. While there are balancing problems, they can generally be overcome with periodic equalization. Equalization forces a small amount of current through the battery pack 13 causing the strong batteries 12 to gas (slowly) and the weak ones to charge. This tends to bring up the weak batteries 12, but this is achieved very slowly. The strong batteries 12 that gas are only a small problem due to the slow gas reaction within the batteries 12. Many types of batteries 12 are also gas recombinant and thus reduces electrolyte loss. However, the gas recombinant reaction recaptures only one of the two different gas molecules given off. This means that equalization tends to very slowly degrade good batteries 12 by releasing small amounts of gas, which reduces the electrolyte and changes its density.

Contrary to battery equalization, the present charge controller and balancer 11 addresses the dynamics of the battery pack 13. The present charge controller and balancer 11 controls more information than just the overall voltage, current, and a temperatures of the battery pack 13. Individual battery voltages and temperature information is utilized. The present invention implements a "weak" battery charging approach. In addition, instead of using equalization charging to obtain balancing, the present charge controller and balancer 11 uses battery balance charging. The present invention thus does not balance the whole battery pack 13 in order to bring one particular battery 12 into balance.

The present charge controller and balancer 11 is adapted to directly charge the individual "weak" battery 12. The control firmware, which is adapted to control a particular battery voltage, number of batteries 12, and cell chemistry, first charges the battery pack 13 to the point of the strongest battery 12 reaches full capacity. After charging is complete, the rest of the time the charge controller and balancer 21 is used to balance the weakest battery 12 using the small (0.5 Amps for example) current source 24.

The present charge controller and balancer 11 monitors the voltage of a selected battery 12 until it reaches its limit and then move on to the next weakest battery 12. Extremely large battery packs 13, such as those used for buses, for example, may require a larger current source 24, which may be readily provided as required. Also the present invention may be used with any battery pack 13, such as photovoltaic energy storage, for example. The present charge controller and balancer 11 slowly balances the battery pack 13 and makes up for differences in balance over time. The present invention is energy efficient because it charges each weak battery 12 instead of using a lot of energy to push current through the entire battery pack 13, wherein most of the energy radiates as heat and causes gas formation.

Thus there has been described a new and improved battery charging apparatus that provides for battery monitoring, charge control, and battery balancing for use with an electric vehicle, and the like. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Apparatus for monitoring, charging and balancing a plurality of serially connected batteries, said apparatus comprising:

a power source means coupled across the plurality of serially connected batteries for providing charging power thereto;

a plurality of sensors coupled to the plurality of batteries for monitoring conditions thereof;

a controller coupled to the power source for communicating therewith to control the operation thereof to charge the plurality of serially connected batteries, and coupled to the plurality of sensors for monitoring the predetermined conditions of the plurality of serially connected batteries;

a plurality of controlled switches wherein adjacent pairs of controlled switches are coupled to respective positive and negative terminals of respective ones of the plurality of batteries, and wherein the controlled switches are coupled to the controller for providing activation control signals thereto;

a monitoring bus coupled to the plurality of controlled switches;

a battery voltage sensor coupled to each of the the plurality of controlled switches by way of the monitoring bus, and coupled to the controller, for selectively sensing the voltage of each of the plurality of batteries under control of the controller; and a current source coupled to the plurality of controlled switches by way of the monitoring bus, and coupled to the controller, for supplying current to a selected battery under control of the controller.

2. The apparatus of claim 1 wherein the current source comprises about a 0.5 amp current source.

3. The charging of claim 1 wherein the plurality of sensors comprise a plurality of temperature sensors and a battery current sensor.

4. The apparatus of claim 1 further comprising a decoder and driver circuit is coupled between the controller and the plurality of controlled switches.

5. The apparatus of claim 1 further comprising an isolated current source coupled to the controller for producing a plurality of voltages thereto.

6. The apparatus of claim 1 further comprising a plurality of signal conditioners coupled between the plurality of sensors and the controller for comparing the conditions sensed by the sensors to predetermined thresholds, and for outputting a signal indicative of the comparison.

\* \* \* \* \*